United States Patent
Sharma

(10) Patent No.: US 10,942,762 B2
(45) Date of Patent: Mar. 9, 2021

(54) LAUNCH WEB BROWSER APPLICATIONS IN MICROSERVICE-BASED CONTAINERS

(71) Applicant: Hewlett Packard Enterprise Development LP, Houston, TX (US)

(72) Inventor: Ranjeet Kumar Sharma, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/370,828

(22) Filed: Mar. 29, 2019

(65) Prior Publication Data

US 2020/0310857 A1 Oct. 1, 2020

(51) Int. Cl.
| G06F 9/455 | (2018.01) |
| G06F 9/50 | (2006.01) |
| H04L 29/12 | (2006.01) |
| H04L 29/08 | (2006.01) |

(52) U.S. Cl.
CPC ........ G06F 9/45558 (2013.01); G06F 9/5027 (2013.01); H04L 61/6022 (2013.01); H04L 67/02 (2013.01); H04L 67/306 (2013.01); G06F 2009/45575 (2013.01); G06F 2009/45595 (2013.01)

(58) Field of Classification Search
CPC ............... G06F 9/45558; G06F 9/5027; G06F 2009/45575; G06F 2009/45595; H04L 61/6022; H04L 67/02; H04L 67/306
USPC ........................................................ 709/226
See application file for complete search history.

(56) References Cited

U.S. PATENT DOCUMENTS

| 7,814,491 | B1* | 10/2010 | Chen ..................... G06F 9/5016 709/226 |
| 8,612,547 | B1 | 12/2013 | Dayan |
| 8,839,422 | B2 | 9/2014 | Ghosh et al. |
| 9,602,524 | B2 | 3/2017 | Ghosh et al. |
| 2008/0162493 | A1* | 7/2008 | Blohm ................ G06F 9/44526 |
| 2010/0064299 | A1* | 3/2010 | Kacin .................... G06F 21/53 719/317 |

(Continued)

OTHER PUBLICATIONS

Jackson, J.; "Saving and Restoring Container State with CRIU"; Jun. 1, 2017; 7 pages.

(Continued)

*Primary Examiner* — Zi Ye
(74) *Attorney, Agent, or Firm* — Jaffery Watson Mendonsa & Hamilton

(57) ABSTRACT

Examples of launching web browser applications in microservice-based containers are disclosed. In an example, a computing resource is fetched, from amongst a plurality of computing resources, in a network, in response to receipt of a redirection request from a client device. The redirection request is generated on initialization of a web browser application in the client device. The computing resource is fetched based on resource availability data indicative of availability of memories and processors of the plurality of computing resources. A microservice-based container is launched in the fetched computing resource, where the microservice-based container is dedicated to the web browser application and linked to the client device. The web browser application is launched in the microservice-based container.

20 Claims, 5 Drawing Sheets

(56) References Cited

U.S. PATENT DOCUMENTS

2012/0303818 A1\* 11/2012 Thibeault .............. G06F 9/5072
   709/226
2014/0019523 A1\* 1/2014 Heymann ............... H04L 29/06
   709/203
2017/0046146 A1\* 2/2017 Jamjoom .................. G06F 8/62

OTHER PUBLICATIONS

Murray, D. et al.; "Create an Application Gateway with URL Path-based Redirection using Azure PowerShell"; Jul. 13, 2018; 13 pages.
Sandboxie; "Sandboxie for Horne Use"; printed on Aug. 2, 2018 from webpage: https://www.sandboxie.com/; 2 pages.
"XenApp and XenDesktop 7.13", Feb. 23, 2017, available online at <https://docs.citrix.com/en-us/xenapp-and-xendesktop/7-13/install-configure/laa-url-redirect.html>, 938 pages.
Alex Hunter, "Server to Client URL Redirection | Redirecting URLs and Protocols", Jan. 25, 2017, available online at <https://www.parallels.com/blogs/ras/server-to-client-url-redirection/>, 3 pages.
Super User, "Can I get my browser to automatically redirect on some pages?", Mar. 1, 2016, available online at <https://web.archive.org/web/20160301060329/https://superuser.com/questions/351771/can-i-get-my-browser-to-automatically-redirect-on-some-pages>, 2 pages.
WikiHow Staff,"How to Redirect a URL", Mar. 29, 2019, available online at <https://www.wikihow.com/Redirect-a-URL>, 4 pages.

\* cited by examiner

LAUNCH WEB BROWSER APPLICATIONS IN MICROSERVICE-BASED CONTAINERS

BACKGROUND

Web browser applications enable web browsing activities related to browsing the Internet, multimedia streaming, and downloading/uploading content from/to the internet. Information over the internet may be accessed and processed through the web browser applications. The web browser applications may access various web resources, such as web pages, emails, information from databases, and web services. The web browser applications also allow functioning of web apps. The web apps may be stored on a remote server and delivered over the Internet through the web browser applications. Examples of web apps include webmail, online retail sales, and online banking.

BRIEF DESCRIPTION OF DRAWINGS

The following detailed description references the drawings, wherein.

DETAILED DESCRIPTION

Figure 1:
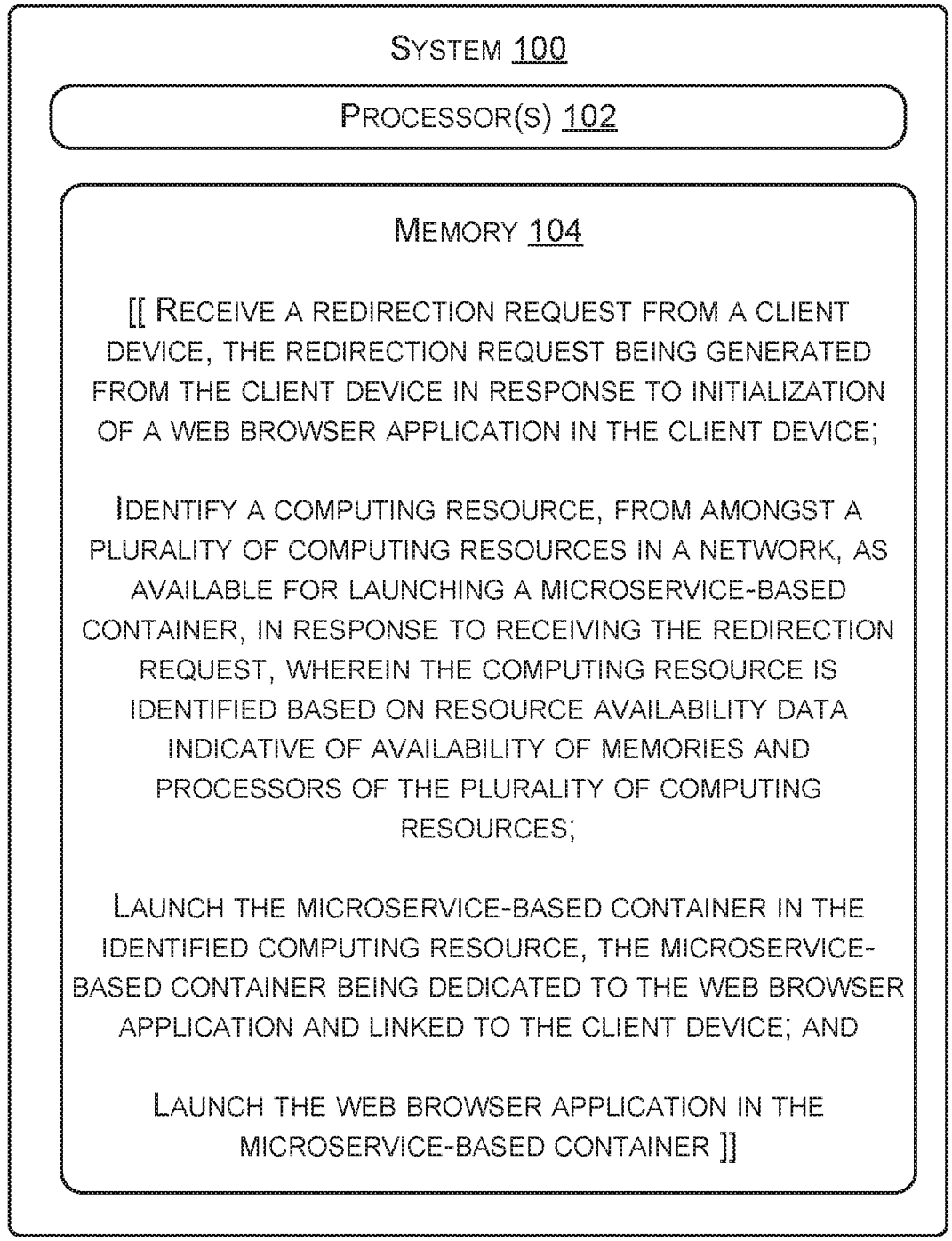
FIG. 1 illustrates a system for launching web browser applications in microservice-based containers, according to an example.

Web browsing activities generally consume significant memory and processing resources of a computer in which the web browser application is running. Higher consumption of memory and processing resources may overload the memory and processing resources of the computer and thereby efficiency of other applications executed by the computer may be reduced. This may impact performance of the other applications.

Consider a scenario, where virtual computing resources, such as virtual machine instances, containers, virtual servers, etc., are running in a computer, such as a server in a datacentre, and a user starts streaming multimedia content through a web browser application launched in the computer. Multimedia streaming generally consumes high network bandwidth and processing resource(s) of the computer which may degrade the performance of the virtual computing resources.

Further, web browsing activities through the web browser applications may be prone to virus attacks or malware attacks. In the above scenario, in case of a virus attack or a malware attack in the web browser application, the virtual computing resources may also be subjected to the virus or malware attack and data processed by the virtual computing resources may get exposed to the virus or malware. Thus, the virtual computing resources being exposed to the virus or malware attack may get corrupt. Corrupt virtual computing resources may not function as intended resulting in redeployment of the virtual computing resources, which may incur a significant cost.

According to the present disclosure, a web browser application launched in a client device, such as a computing system, is redirected to a separate microservice-based container within which the web browser application is executed. The microservice-based container may be launched in a computing resource separate from the client device. By executing the web browser application within the microservice-based container, the web browser application is isolated from the client device. Thus, memory and processing resource(s) of the client device are not consumed for execution of the web browser application, thereby enabling efficient operation of other applications in the client device. Further, risk of data loss of the client device, through virus or malware attacks encountered by the web browser application may be reduced, since data and processes of the web browser application are isolated from the client device.

In the present disclosure, methods and systems are described, in which a computing resource is fetched, from amongst a plurality of computing resources, in a network. A computing resource has data processing, computation, and networking capabilities. The computing resource may include virtual machines. The plurality of computing resources may be connected over the network, such as the internet, a Local Area Network (LAN), a virtual network, or a combination thereof.

The computing resource is fetched in response to receipt of a redirection request from a client device. The redirection request is generated on initialization of a web browser application in the client device. The redirection request refers to a message received from the client device, where the message indicates that the web browser application initialized in the client device is to be redirected. The client device may be a computing system connected to the network via the internet or via LAN. The computing resource is fetched based on resource availability data indicative of availability of memories and processors of the plurality of computing resources. The resource availability data may be expressed in terms of a percentage of Central Processing Unit (CPU) usage and memory usage of each of the plurality of computing resources. A microservice-based container is launched in the fetched computing resource. Launching the microservice-based container refers to creating a container in the fetched computing resource and deploying a microservice within the container. The container has operating system (OS)-like capabilities to execute an application. Thus, the container may include system tools, system libraries, OS filesystems, etc. In an example, launching the microservice-based container includes installing a web-based application/web browser application/web app for carrying out web browsing activities in the microservice-based container.

The container created in the fetched computing resource refers to an isolated user-space in which computer programs/applications run directly on a kernel of an OS of the computing resource and has access to a predefined subset of resources of the OS and a designated portion of a memory of the computing resource. A predefined portion of the filesystem of the computing resource may be exposed to the container and a specific set of devices may be assigned to the container. The predefined portion of the filesystem and the specific set of devices may be accessed by applications running within the container. Thus, each container has its respective portion of the memory designated to it and a respective subset of resources of the operating system which are accessible by applications running inside each container. Thus, the data processed and stored by applications running inside each container are isolated from one another and from the client device. A microservice is an application structured as a suite of services, each running in its own process and communicating with lightweight resources, such as an Hyper Text Transfer Protocol (HTTP) resource Application Programming Interface (API). Microservices are independently deployable. A microservice may be deployed within the container.

The launched microservice-based container is dedicated to the web browser application and linked to the client device. The microservice-based container is configured to execute services and processes which may be executed by the web browser application, such as launching Unique Resource Locators (URLs) and web apps. The web browser application is then launched in the microservice-based container. Launching of the web browser application refers to execution of operations of the web browser application, such as accessing URLs or running web apps, within the microservice-based container.

Since, the web browser is launched in an isolated environment of the microservice-based container separate from the memory and processing resources of the client device, therefore, the memory and processing resources of the client device are not consumed by the web browser application, consequently enhancing the performance of the client device. Also, since the web browser application is launched in the microservice-based container, therefore, data and processes of the web browser application are isolated from data and processes of other applications executed in the client device which thereby remain secure from virus or malware which may attack the web browser application. Further, according to the present disclosure, the microservice-based container is launched in a computing resource, such as a compute node or a virtual machine, based on availability of memories and processors in the computing resource, which prevents overloading of a single computing resource with multiple containers running in it.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a system 100 for launching web browser applications in microservice-based containers. The system 100 may be a computing resource having data processing, storage, and networking capabilities. Examples of the system 100 include personal computers, laptops, enterprise servers, embedded systems, or the like. In an example, the system 100 may be implemented through a cloud monitoring and management platform that can monitor and manage computing resources connected over a cloud network. The system 100 may be connected to other computing resources over a network, such as the Internet, a LAN, a virtual network, etc.

The system 100 includes a processor 102 and a memory 104 coupled to the processor 102. The memory 104 stores instructions executable by the processor 102. The instructions when executed by the processor 102 may cause the processor 102 to receive a redirection request from a client device. The redirection request is generated from the client device in response to initialization of a web browser application in the client device. In a cloud network environment, examples of the client device include compute nodes, virtual machines, servers, or the like. The redirection request refers to a message received from the client device, where the message indicates that a web browser application initialized in the client device is to be redirected. In an example, the web browser application may be initialized at the client device when a URL or a web app is launched in the client device. The web browser application may also be directly launched by a user of the client device.

In response to receiving the redirection request, the instructions when executed by the processor 102 may cause the processor 102 to identify a computing resource, from amongst a plurality of computing resources in a network, as available for launching a microservice-based container. In an example, the plurality of computing resources may include compute nodes, virtual machines, etc. in a cloud network. The network may be one of a cloud network, a Local Area Network (LAN), and a combination thereof.

The computing resource is identified as available, based on resource availability data indicative of availability of memories and processors of the plurality of computing resources. In an example, the resource availability data of a computing resource may be expressed in terms of percentage of CPU usage indicative of the availability of processor of the computing resource and percentage of memory usage indicative of availability of storage space in the computing resource. In an example, the resource availability data may be represented as a ratio of the percentage of CPU usage and the percentage of memory usage. The computing resource having availability of processor and memory above a predefined threshold, may be identified as available for launching the microservice-based container.

The instructions when executed by the processor 102 may further cause the processor 102 to launch the microservice-based container in the computing resource identified as available. The microservice-based container is dedicated to the web browser application and is linked to the client device. In an example, the microservice-based container is configured to execute functions of the web browser application. In an example, the client device is associated with the microservice-based container through an identification number of the client device. In an example, the microservice-based container is linked to the client device through one of a Media Access Control (MAC) address, an Internet Protocol (IP) address, a Universally Unique Identification Number (UUID), a user name, a profile name, and a combination thereof, of the client device.

The instructions when executed by the processor 102 may further cause the processor 102 to launch the web browser application in the microservice-based container. Launching the web browser application indicates execution of the web browser application within the microservice-based container. In an example, each web browser application launched in different client devices, is executed in respective microservice-based applications linked to the different client devices. Thus, the present disclosure facilitates in launching the web browser applications within isolated microservice-based containers separate from the client device. Consequently, the processing and memory resource consumption of the client device may be reduced. Also, the client device may be less prone to malware or virus attacks encountered by the web browser application.

Figure 2:
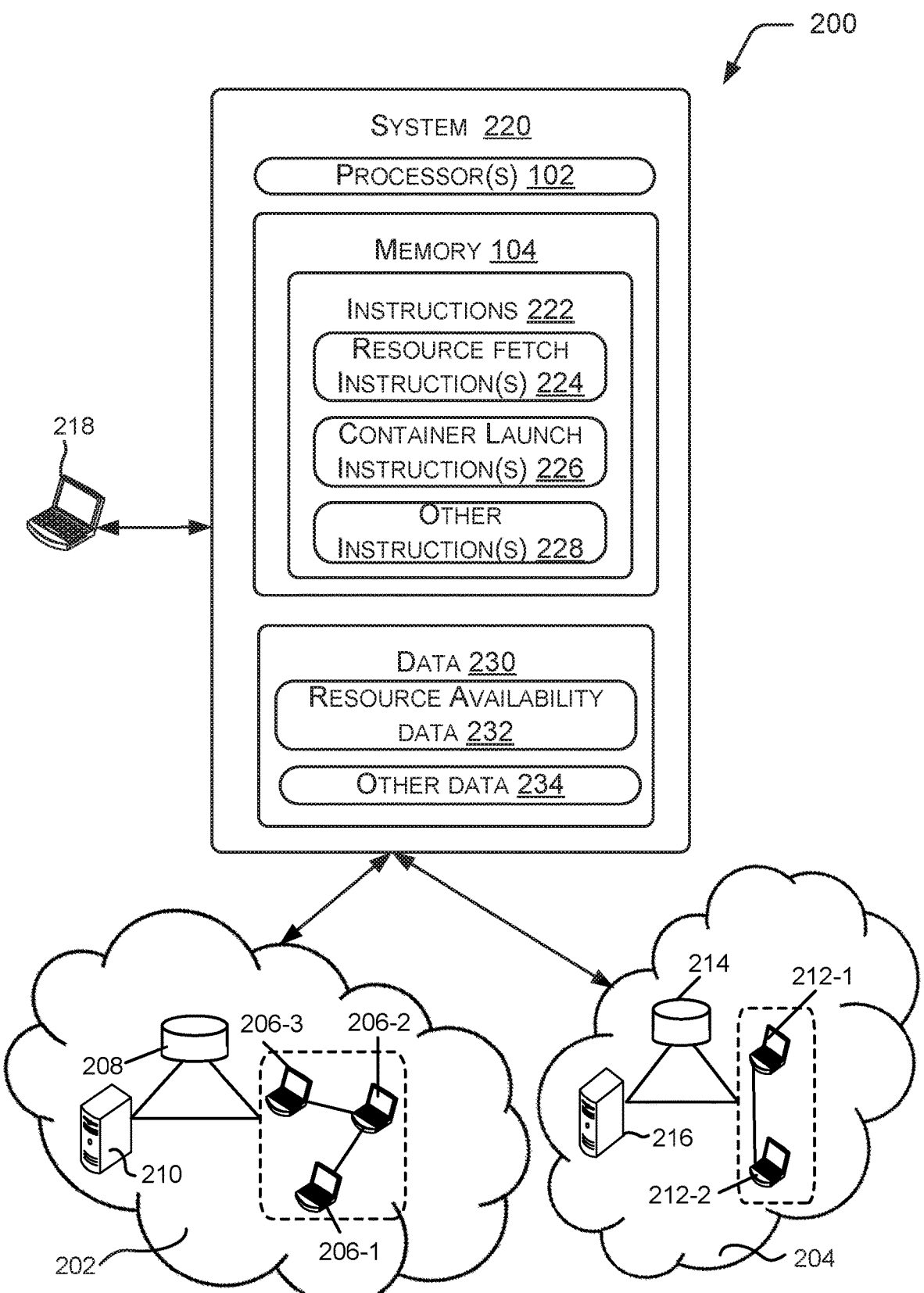
FIG. 2 illustrates a cloud environment, according to an example.

FIG. 2 illustrates a cloud environment 200, according to an example of the present subject matter. The cloud environment 200 includes a first cloud network 202 and a second cloud network 204. The first and second cloud networks 202 and 204 have cloud hosting capabilities. A cloud network may include physical computing resources which may act as host systems, also called compute nodes. The cloud network may also include a storage pool formed of multiple storage systems which are part of the cloud network. Each computing resource may deploy a hypervisor to enable multiple virtual machines (VMs) to be run on a single computing resource. A computing resource may thus provide storage, networking, memory, and processing resources that can be consumed by virtual machines (VMs) hosted by the computing resource. A hypervisor or a virtual machine monitor (VMM) includes a computer software, firmware, hardware, or a combination thereof that can create and run VMs. Each VM running on a hypervisor can execute its own operating system and can be associated with a certain section of the storage pool. Each VM may run different applications and services. The hypervisor provides a virtual operating platform for the VMs, manages execution of the operating systems of the VMs, and enables sharing of virtualized hardware of the computing resources among the VMs, such that different operating systems of different VMs can run on a single computing resource.

As shown in FIG. 2, the first cloud network 202 includes computing resources 206-1, 206-2, and 206-3, collectively referred to as a first set of computing resources 206. Each of the first set of computing resource 206 may host one VM or more than one VM. Although, the first cloud network 202 is shown to include three computing resources there may be more than three or less than three computing resources in the first cloud network 202. The first cloud network 202 further includes a first data storage device 208. Each of the first set of computing resources 206 may have a respective storage volume of the first data storage device 208 associated with it. Although, the first cloud network 202 is shown to include one data storage device, there may be more than one data storage devices in the first cloud network 202. The first cloud network 202 also includes a first cloud controller 210 that can manage operations of the computing resources 206 in the first cloud network 202. Although, the first cloud network 202 is shown to include one cloud controller, there may be more than one cloud controllers in the first cloud network 202.

As shown in FIG. 2, the second cloud network 204 includes computing resources 212-1 and 212-2, collectively also referred to as a second set of computing resources 212. Each of the second set of computing resources 212 may host one VM or more than one VM. Although, the second cloud network 204 is shown to include two computing resources there may be more than two or less than two computing resources in the second cloud network 204. The second cloud network 204 further includes a second data storage device 214. Each of the second set of computing resources 212 may have a respective storage volume of the second data storage device 214 associated with it. Although, the second cloud network 204 is shown to include one data storage device, there may be more than one data storage devices in the second cloud network 204. The second cloud network 204 also includes a second cloud controller 216 that can manage operations of the second set of computing resources 212 in the second cloud network 204. Although, the second cloud network 204 is shown to include one cloud controller, there may be more than one cloud controllers in the second cloud network 204.

The cloud environment 200 further includes a client device 218. The client device 218 may be a compute node of the cloud environment 200. Although in FIG. 2, the client device 218 is shown to be external to the first and second cloud networks 202 and 204, in an example, the client device may be a computing resource in one of the first and second cloud networks 202 and 204. In an example, the client device 218 may be an enterprise server maintained in a datacenter which may connect to the cloud environment 200. In another example, the client device 218 may be a computer connected to the cloud environment 200.

The cloud environment 200 further includes a system 220 for redirection of web browser applications to microservice-based containers. In an example, the system 220 may be implemented in a cloud management platform of the cloud environment 200. Although in FIG. 2, the system 220 is shown external to the first and second cloud networks 202 and 204, in an example, the system 220 may be implemented, at least in part, in the first and second set of computing resources 206 and 212 of the first and second cloud networks 202 and 204.

The system 220 includes the processor 102 and the memory 104 coupled to the processor 102. The memory 104 stores instructions executable by the processor 102. The processor 102 may be implemented as microprocessors, microcomputers, microcontrollers, digital signal processors, central processing units, state machines, logic circuitries, and any devices that manipulate signals based on operational instructions. Among other capabilities, the processor 102 is configured to fetch and execute computer-readable instructions stored in the memory 104. The computer-readable instructions, also referred to as instructions, includes instructions 222. The instructions may include routines, programs, components, applications, data structures, and the like, which perform particular tasks or implement particular abstract data types. The instructions, being executable by the processor(s), may also be referred to as processor-executable instructions. The execution of the instructions to perform a function may be interchangeably referred to as the instructions causing performance of the function or the instructions enabling performance of the function.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other custom-built hardware, may also be included.

The memory 104 may include any computer-readable medium known in the art including, for example, volatile memory (e.g., RAM), and/or non-volatile memory (e.g., EPROM, flash memory, etc.). The instruction(s) 222 include resource fetch instruction(s) 224 which corresponds to instructions stored on a computer-readable medium and executable by a processor to fetch a computing resource in which a microservice-based container may be launched and container launch instruction(s) 226 which corresponds to instructions stored on a computer-readable medium and executable by a processor to launch the microservice-based container. The instruction(s) 222 also comprise other instruction(s) 228 that supplement applications on the system 220, for example, execution of functions of an operating system.

Data 230 serves, amongst other things, as a repository for storing data that may be fetched, processed, received, or generated during execution of the instruction(s) 222 by the processor 102. The data 230 comprises resource availability data 232 which stores data relating to availability of memories and processors in the plurality of computing resources in the cloud environment 200. The data 230 also comprises other data 234 that may be fetched, processed, received, or generated during execution of other instruction(s) 228.

Consider that a web browser application is initialized in the client device 218. In an example, the web browser application may be initialized in response to a web app or an URL being launched by a user of the client device 218. The client device 218 is configured to send a redirection request to the system 220 in response to the web browser application being initialized. In operation, the system 220 receives the redirection request from the client device 218, the redirection request being generated from the client device 218, in response to initialization of the web browser application in the client device 218.

On receiving the redirection request, the system 220 is prompted to fetch a computing resource for launching a microservice-based container. The resource fetch instructions 224 when executed by the processor 102, causes the processor 102 to fetch a computing resource, from the first set of computing resources 206 and the second set of computing resources 212. The computing resource is fetched based on resource availability data, such as the resource availability data 232. In an example, the resource availability data 232 may be collected from the first and second cloud controllers 210 and 216 of the first and second cloud networks 202 and 204 and may be periodically updated in a database maintained in the memory 104 of the system 220. The resource availability data is indicative of availability of memories and processors of the plurality of computing resources, such as the first and second set of computing resources 206 and 212.

In an example, the resource fetch instructions 224 enable the processor 102 to determine a resource availability indicator for each of the plurality of computing resources based on the resource availability data. In an example, the resource availability indicator may be represented in terms of a percentage of CPU usage and a percentage of memory usage of each of the plurality of computing resources. With reference to FIG. 2, the resource availability indicator may be determined for each of the first and second set of computing resources 206 and 212. The resource fetch instructions 224 further enable the processor 102 to compare the resource availability indicator for each of the plurality of computing resources with a predefined threshold. When the resource availability indicator of a computing resource, from amongst the plurality of computing resources, is determined to be above the predefined threshold, the computing resource is identified as available for launching a microservice-based container. Thus, based on the resource availability data, a computing resource may be identified as available for launching the microservice-based container.

Once a computing resource is identified as available, the container launch instructions 226 are executed by the processor 102 which cause the processor 102 to launch the microservice-based container in the computing resource identified to be available. The container launch instructions 226 when executed by the processor 102, cause the processor 102 to dedicate the microservice-based container to the web browser application. Thus, the microservice-based container is configured such that it has OS components and applications to launch and execute the web browser application.

Further, the container launch instructions 226 when executed by the processor 102 cause the processor 102 to link the microservices-based container to the client device 218 in which the web browser application is initialized. Linking the microservices-based container to the client device 218 includes tagging the microservices-based container as being used by the client device 108. In an example, the microservice-based container may be tagged using one of a Media Access Control (MAC) address, an Internet Protocol (IP) address, a Universally Unique Identification Number (UUID), a user name, profile name, and a combination thereof, of the client device 218. Once the client device 108 is linked with the microservice-based container, one web browser application or more than one web browser launched by the client device 218 may be redirected to the linked microservice-based container.

The container launch instructions 226 when executed by the processor 102, cause the processor 102 to launch the web browser application in the launched microservice-based container. Launching the web browser application in the microservice-based container refers to executing the processes of the web browser application within the microservice-based container.

Data processed by the web browser application launched within the microservice-based container, may be stored in a memory designated to the microservice-based container. A portion of the data processed by the web browser application launched within the microservice-based container may be referred to as the memory state information of the microservice-based container. In an example, the memory state information includes log files, Uniform Resource Locator (URL) information, Hyper Text Transfer Protocol (HTTP) cookies, temporary internet files, user information, and streaming buffer information. The container launch instructions 226 may further cause the processor 102 to store the memory state information of the microservice-based container in a persistent storage. In an example, the persistent storage may be a storage device, such as the first and second data storage devices 208 and 214.

In an example, consider that the user of the client device 218 launches a streaming content in the web browser application launched in the microservice-based container and terminates the web browser application while the streaming content is buffered. The memory state information of the microservice-based container includes timestamps of the buffered streaming content as a part of the streaming buffer information which is stored in the persistent storage. If at a later point in time, the user relaunches the web browser application and resumes buffering of the streaming content, the streaming content may be buffered from where the user had left in the previous session, based on the timestamps stored within the memory state information. Thus, a web resource may be executed in the web browser application launched in the microservice-based container, based on the memory state information.

Further, in an example, a user of the client device 218 may launch a plurality of web browser applications. The container launch instructions 226 causes the processor 102 to launch the plurality of web browser applications in the microservice-based container linked with the client device 218. Thus, all the web browser applications initialized by a single client device, such as the client device 218, are launched in a single microservice-based container linked with the client device 218. In an example, different microservice-based containers may also be created for each instance of a web browser application launched by the client device 218.

After the user completes the web browsing activities in the web browser application, the user may provide an input to terminate the web browser application in the client device 218. Once the client device 218 receives the input to the terminate the web browser application, the system 220 may receive a message from the client device indicating that the web browser application is terminated. In response, the container launch instructions 226 may be executed by the processor 102 which cause the processor 102 to terminate the microservice-based container linked to the client device 218. On termination of the microservice-based container in response to termination of the web browser application at the client device 218, a portion of the memory and processor of the computing resource designated to the microservice-based container is freed up.

Figure 3:
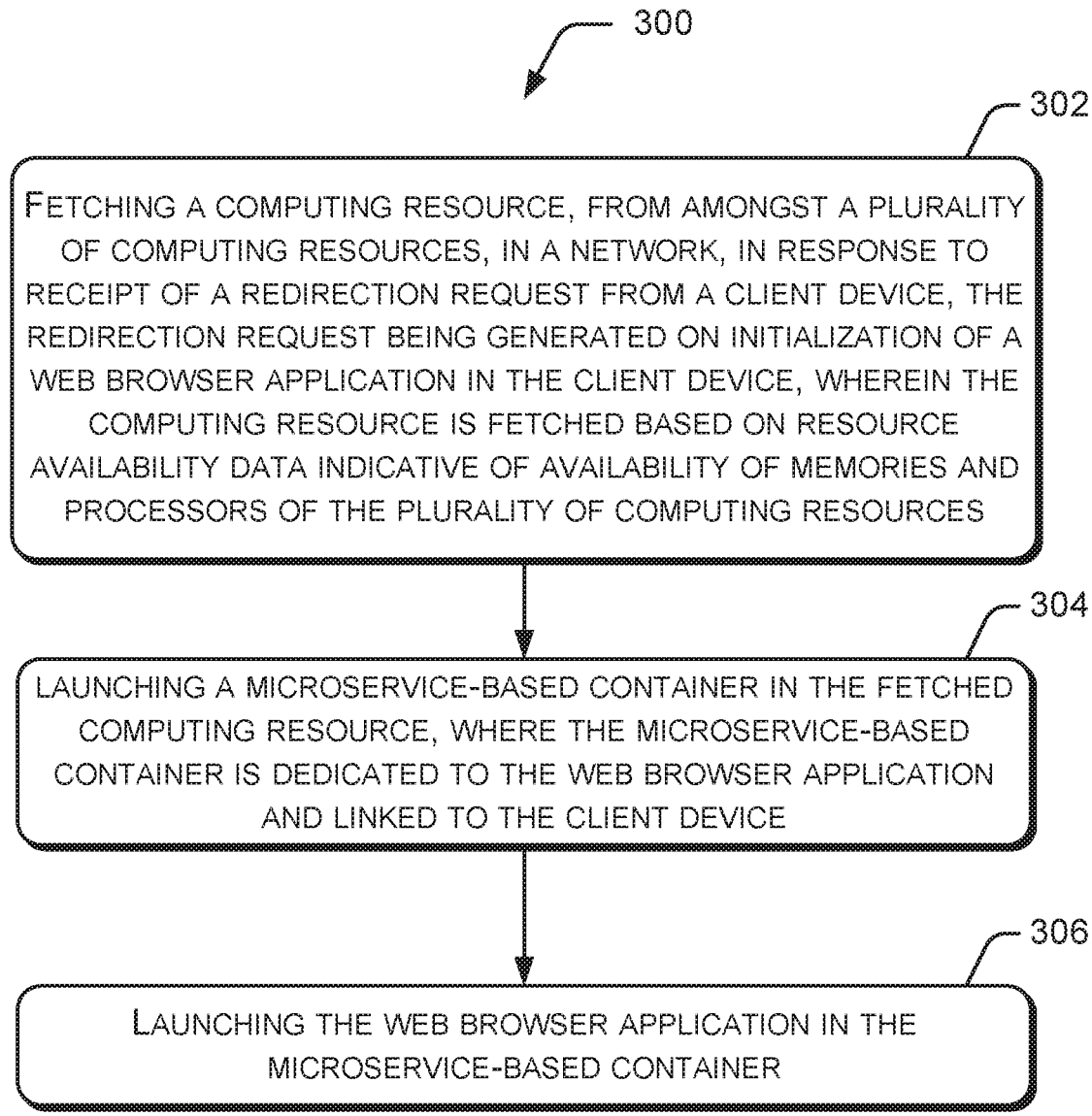
FIG. 3 illustrates a method for launching web browser applications in microservice-based containers, according to an example.

FIG. 3 illustrates a method 300 for launching web browser applications in microservice-based containers, according to an example. The method 300 may be executed by a system, such as the system 100 or 220. The method 300 can be implemented by processing resource(s) or computing device(s) through any suitable hardware, a non-transitory machine readable medium, or combination thereof. In an example, step(s) of the method 300 may be performed by execution of computer-readable instructions, such as the resource fetch instruction(s) 224 and the container launch instruction(s) 226, which includes instructions stored on a medium and executable by a processing resource, such as the processor 102, of a system, such as the system 100 or 220. Further, although the method 300 is described in context of the aforementioned system 100 or 220, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, a computing resource is fetched, from amongst a plurality of computing resources, in a network. The plurality of computing resources may be connected over the network. The network may be one of a cloud network, a Local Area Network (LAN), and a combination thereof. The computing resource is fetched in response to receipt of a redirection request from a client device. The redirection request is generated by the client device on initialization of a web browser application in the client device. The computing resource is fetched based on resource availability data indicative of availability of memories and processors of the plurality of computing resources.

At block 304, a microservice-based container is launched in the fetched computing resource. The microservice-based container is dedicated to the web browser application and linked to the client device. Launching the microservice-based container refers to creating a container in the fetched computing resource and deploying a microservice within the container. The container has operating system (OS)-like capabilities to execute an application. Thus, the container may include system tools, system libraries, OS filesystems, etc. The container created in the fetched computing resource refers to an isolated user-space in which computer programs/ applications run directly on a kernel of an OS of the computing resource and has access to a predefined subset of resources of the OS and a designated portion of a memory of the computing resource. A microservice is an application structured as a suite of services, each running in its own process and communicating with lightweight resources, such as an Hyper Text Transfer Protocol (HTTP) resource Application Programming Interface (API). Microservices are independently deployable. A microservice may be deployed within the container.

At block 306, the web browser application is launched in the microservice-based container, such that a web browser microservice is executed within the microservice-based container and data processed by the web browser application is stored in the memory designated for the microservice-based container.

Figure 4:
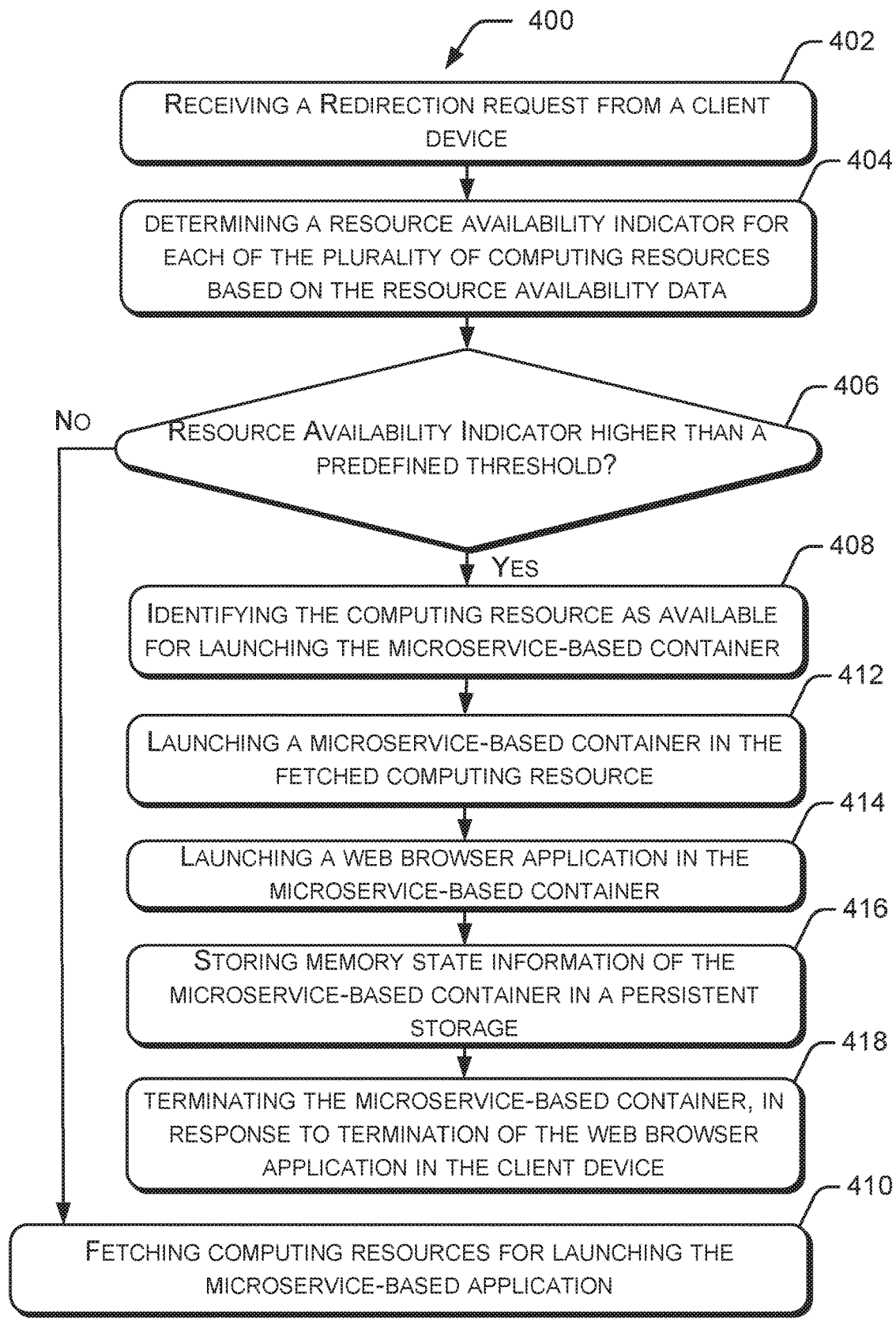
FIG. 4 illustrates another method for launching web browser applications in microservice-based containers, according to an example.

FIG. 4 illustrates another method 400 for launching web browser applications in microservice-based containers, according to an example. The method 400 may be executed by a system, such as the system 100 or 220. The method 400 can be implemented by processing resource(s) or computing device(s) through any suitable hardware, a non-transitory machine readable medium, or combination thereof. In an example, the method 400 may be performed by computer-readable instructions, such as the resource fetch instruction(s) 224 and the container launch instruction(s) 226 which include instructions stored on a medium and executable by a processing resource, such as the processor 102, of a system, such as the system 100 or 220. Further, although the method 400 is described in context of the aforementioned system 100 or 220, other suitable systems may be used for execution of the method 400. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 4, at block 402, a redirection request is received from a client device, such as the client device 218 in FIG. 2. The redirection request is generated by the client device 218 in response to initialization of a web browser application in the client device.

In response to receiving the redirection request, a resource availability indicator for each of the plurality of computing resources is determined based on the resource availability data, at block 404. At block 406, the resource availability indicator is compared with a predefined threshold. At block 408 ('Yes' branch from block 406), the computing resource is identified as available for launching the microservice-based container, in response to determining that the resource availability indicator is above the predefined threshold. Thus, the computing resource may be fetched based on the resource availability data. At block 410 ('No' branch from block 406), other computing resources are fetched for launching the microservice-based container, in response to determining that the resource availability indicator is below the predefined threshold. Thus, the computing resource may be fetched based on the resource availability data.

Once the computing resource is fetched, a microservice-based container is launched in the fetched computing resource, at block 412. The microservice-based container is dedicated to the web browser application and linked to the client device. Linking the microservice-based container with the client device refers to tagging the microservice-based container for the client device. In an example, the microservice-based container may be linked to the client device through one of a Media Access Control (MAC) address, an Internet Protocol (IP) address, a Universally Unique Identification Number (UUID), a user name, profile name, and a combination thereof, of the client device.

The web browser application is then launched in the microservice-based container, at block 414. Launching the web browser application in the microservice-based container refers to executing processes and services of the web browser application using the memory and processing resources designated to the microservice-based container. In an example, web browser applications launched by a client device are launched in the microservice-based container linked with the client device.

Data processed and/or stored by the web browser application launched within the microservice-based container, is stored in the form of a memory state information of the microservice-based container in a persistent storage, at block 416. The memory state information includes data processed by the web browser application. Examples of the memory state information include log files, Uniform Resource Locator (URL) information, Hyper Text Transfer Protocol (HTTP) cookies, temporary internet files, user information, and streaming buffer information. After a user of the web browser application terminates the web browser application in the client device, in response to termination of the web browser application, the microservice-based container is terminated, at block 418.

Figure 5:
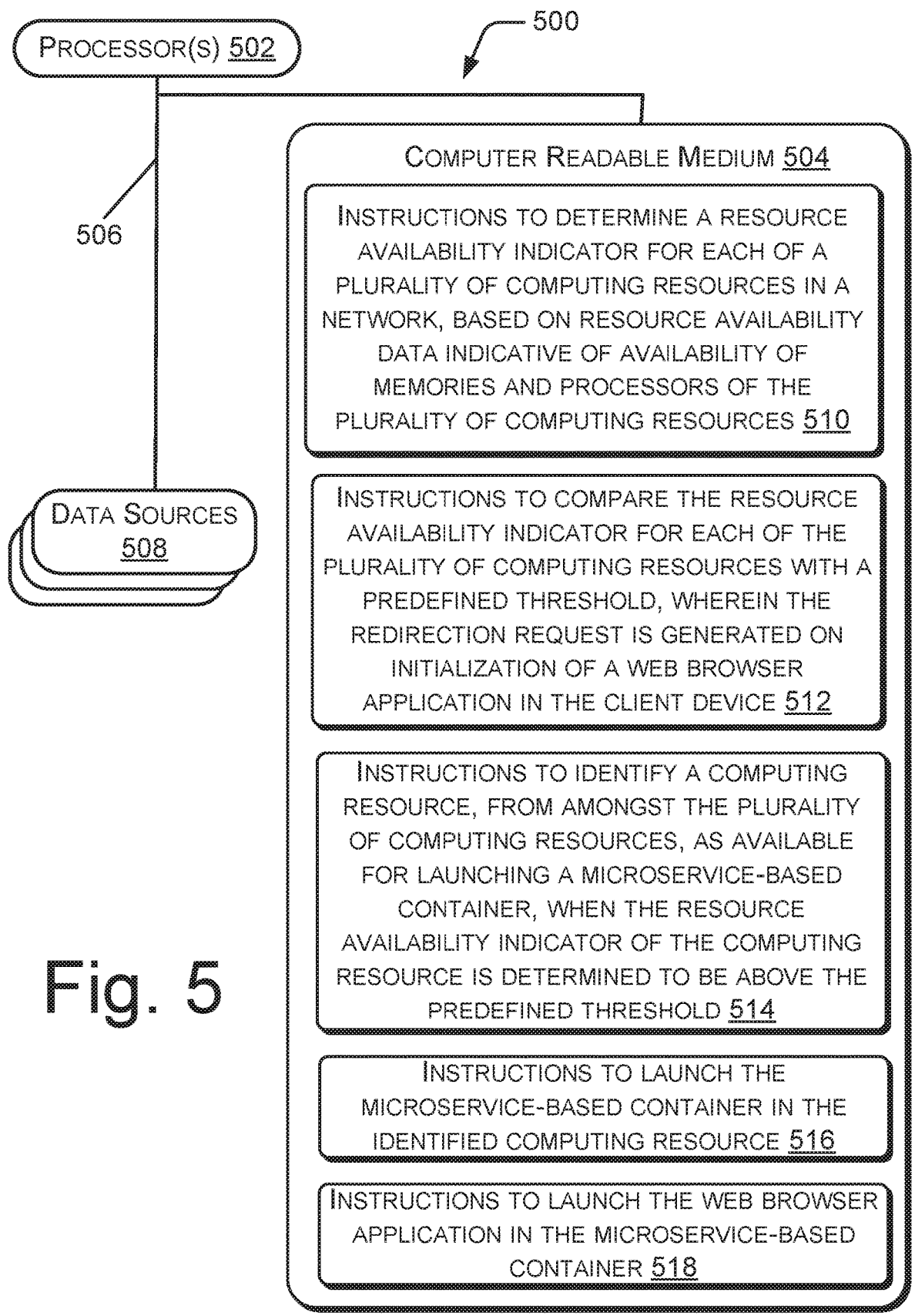
FIG. 5 illustrates a system environment implementing a non-transitory computer-readable medium for launching of web browser applications in microservice-based containers, according to an example.

FIG. 5 illustrates a system environment 500 implementing a non-transitory computer-readable medium for launching web browser applications in microservice-based containers, according to an example. In an example, the system environment 500 includes processor(s) 502 communicatively coupled to a non-transitory computer-readable medium 504 through a communication link 506. In an example, the system environment 500 may be a system, such as the system 100 or 220. In an example, the processor(s) 502 may have one or more processing resources for fetching and executing computer-readable instructions from the non-transitory computer-readable medium 504.

The non-transitory computer-readable medium 504 can be, for example, an internal memory device or an external memory device. In an example implementation, the communication link 506 may be a direct communication link, such as any memory read/write interface.

The processor(s) 502 and the non-transitory computer-readable medium 504 may also be communicatively coupled to data sources 508 over a network, such as the Internet. The data sources 508 can include, for example, memory of the system, such as the system 100 or 220.

In an example implementation, the non-transitory computer-readable medium 504 includes a set of computer-readable instructions which can be accessed by the processor(s) 502 through the communication link 506 and subsequently executed to perform acts for generation of an instruction stream for validating processor functionality.

Referring to FIG. 5, in an example, the non-transitory computer-readable medium 504 includes instructions 510 that cause the processor(s) 502 to determine a resource availability indicator for each of a plurality of computing resources in a network, based on resource availability data indicative of availability of memories and processors of the plurality of computing resources.

Further, the non-transitory computer-readable medium 504 includes instructions 512 that cause the processor(s) 502 to compare the resource availability indicator for each of the plurality of computing resources with a predefined threshold, in response to receipt of a redirection request from a client device. The redirection request is generated on initialization of a web browser application in the client device.

The non-transitory computer-readable medium 504 includes instructions 514 that cause the processor(s) 502 to identify a computing resource, from amongst the plurality of computing resources, as available for launching a microservice-based container, when the resource availability indicator of the computing resource is determined to be above the predefined threshold.

Further, the non-transitory computer-readable medium 504 includes instructions 516 that cause the processor(s) 502 to launch the microservice-based container in the identified computing resource, the microservice-based container being dedicated to the web browser application and linked to the client device.

Further, the non-transitory computer-readable medium 504 includes instructions 518 that cause the processor(s) 502 to launch the web browser application in the microservice-based container, such that data processed by the web browser application is stored in the memory designated for the microservice-based container.

In an example, the non-transitory computer-readable medium 504 includes instructions that cause the processor(s) 502 to store memory state information of the microservice-based container in a persistent storage. The memory state information includes data processed by the web browser application. Examples of the memory state information include log files, Uniform Resource Locator (URL) information, Hyper Text Transfer Protocol (HTTP) cookies, temporary internet files, user information, and streaming buffer information. In an example, the non-transitory computer-readable medium 504 includes instructions that cause the processor(s) 502 to launch a web resource in the web browser application launched in the microservice-based container based on the memory state information. In an example, the non-transitory computer-readable medium 504 includes instructions that cause the processor(s) 502 to terminate the microservice-based container, in response to termination of the web browser application in the client device.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

I claim:

1. A method comprising:
responsive to initialization of a web browser application on a client device, receiving, by a processing resource of a network, a redirection request from the client device, wherein the re direction request is generate d responsive to the initialization of the web browse r application and indicates the web browser application initialized in the client device is to be redirected;
fetching, by the processing resource, a computing resource, from amongst a plurality of computing resources, in the network, in response to receipt of the redirection request, wherein the computing resource is fetched based on resource availability data indicative of availability of memories and processors of the plurality of computing resources; and
mitigating, by the processing resource, a risk of a malware attack on the web browser application impacting the client device and reducing processing and memory resource consumption on the client device that would otherwise be experienced by isolating the client device from data and processes of the web browser application, including:

launching a microservice-based container in the fetched computing resource, wherein the microservice-based container is dedicated to running one or more web browser applications on behalf of the client device and linked to the client device; and launching the web browser application in the microservice-based container.

2. The method as claimed in claim 1, further comprising: terminating the microservice-based container, in response to termination of the web browser application in the client device.

3. The method as claimed in claim 1, further comprising: storing memory state information of the microservice-based container in a persistent storage, wherein the memory state information includes data processed by the web browser application; and launching a web resource in the web browser application launched in the microservice-based container based on the memory state information.

4. The method as claimed in claim 3, wherein the memory state information includes log files, Uniform Resource Locator (URL) information, Hyper Text Transfer Protocol (HTTP) cookies, temporary internet files, user information, and streaming buffer information.

5. The method as claimed in claim 1, wherein fetching the computing resource comprises:

determining a resource availability indicator for each of the plurality of computing resources based on the resource availability data; and identifying the computing resource as available for launching the microservice-based container, in response to determining that the resource availability indicator is above a predefined threshold.

6. The method as claimed in claim 1, further comprising: launching a plurality of web browser applications in the microservice-based container, wherein the plurality of web browser applications are initialized in the client device.

7. The method as claimed in claim 1, wherein the microservice-based container is linked to the client device through one of a Media Access Control (MAC) address, an Internet Protocol (IP) address, a Universally Unique Identification Number (UUID), a user name, profile name, and a combination thereof, of the client device.

8. The method as claimed in claim 1, wherein the network is one of a cloud network, a Local Area Network (LAN), and a combination thereof.

9. A system comprising:
a processor; and
a memory coupled to the processor, the memory storing instructions executable by the processor to:

receive a redirection request from a client device, the redirection request being generated from the client device in response to initialization of a web browser application in the client device, wherein the redirection request indicates the web browser application initialized in the client device is to be redirected;

identify a computing resource, from amongst a plurality of computing resources in a network, as available for launching a microservice-based container, in response to receiving the redirection request, wherein the computing resource is identified based on resource availability data indicative of availability of memories and processors of the plurality of computing resources; and mitigate a risk of a malware attack on the web browser application impacting the client device and reduce processing and memory resource consumption on the client device that would otherwise be experienced by isolating the client device from data and processes of the web browser application, including:

launching the microservice-based container in the identified computing resource, the microservice-based container being dedicated to running one or more web browser applications on behalf of the client device and linked to the client device; and launching the web browser application in the microservice-based container.

10. The system as claimed in claim 9, wherein the processor is further to:

terminate the microservice-based container, in response to termination of the web browser application in the client device.

11. The system as claimed in claim 9, wherein the processor is further to:

store memory state information of the microservice-based container in a persistent storage, wherein the memory state information includes data processed by the web browser application; and launch a web resource in the web browser application launched in the microservice-based container based on the memory state information.

12. The system as claimed in claim 11, wherein the memory state information includes log files, Uniform Resource Locator (URL) information, Hyper Text Transfer Protocol (HTTP) cookies, temporary internet files, user information, and streaming buffer information.

13. The system as claimed in claim 9, wherein the processor is further to:

determine a resource availability indicator for each of the plurality of computing resources based on the resource availability data; and compare the resource availability indicator for each of the plurality of computing resources with a predefined threshold, wherein when the resource availability indicator of a computing resource, from amongst the plurality of computing resources, is determined to be above a predefined threshold, the computing resource is identified as available for launching the microservice-based container.

14. The system as claimed in claim 9, wherein the processor is further to:

launch a plurality of web browser applications in the microservice-based container, wherein the plurality of web browser applications are initialized in the client device.

15. The system as claimed in claim 9, wherein the microservice-based container is linked to the client device through one of a Media Access Control (MAC) address, an Internet Protocol (IP) address, a Universally Unique Identification Number (UUID), a user name, profile name, and a combination thereof, of the client device.

16. The system as claimed in claim 9, wherein the network is one of a cloud network, a Local Area Network (LAN), and a combination thereof.

17. A non-transitory computer-readable medium comprising computer-readable instructions, the computer-readable instructions when executed by a processor, cause the processor to:
   determine a resource availability indicator for each of a plurality of computing resources in a network, based on resource availability data indicative of availability of memories and processors of the plurality of computing resources;
   in response to receipt of a redirection request from a client device, compare the resource availability indicator for each of the plurality of computing resources with a predefined threshold, wherein the redirection request is generated on initialization of a web browser application in the client device and indicates the web browser application initialized in the client device is to be redirected;
   identify a computing resource, from amongst the plurality of computing resources, as available for launching a microservice-based container, when the resource availability indicator of the computing resource is determined to be above the predefined threshold; and
   mitigate a risk of a malware attack on the web browser application impacting the client device and reduce processing and memory resource consumption on the client device that would otherwise be experienced by isolating the client device from data and processes of the web browser application, including:
      launching the microservice-based container in the identified computing resource, the microservice-based container being dedicated to running one or more web browser applications on behalf of the client device and linked to the client device; and
      launching the web browser application in the microservice-based container.

18. The non-transitory computer-readable medium as claimed in claim 17, wherein the computer-readable instructions, when executed by the processor, further cause the processor to:
   terminate the microservice-based container, in response to termination of the web browser application in the client device.

19. The non-transitory computer-readable medium as claimed in claim 17, wherein the computer-readable instructions, when executed by the processor, further cause the processor to:
   store memory state information of the microservice-based container in a persistent storage, wherein the memory state information includes data processed by the web browser application; and
   launch a web resource in the web browser application launched in the microservice-based container based on the memory state information.

20. The non-transitory computer-readable medium as claimed in claim 19, wherein the memory state information includes log files, Uniform Resource Locator (URL) information, Hyper Text Transfer Protocol (HTTP) cookies, temporary internet files, user information, and streaming buffer information.

* * * * *